(12) United States Patent
Frio et al.

(10) Patent No.: US 11,129,498 B2
(45) Date of Patent: Sep. 28, 2021

(54) SYSTEMS AND METHODS OF FOOD PREPARATION AUTOMATION

(71) Applicant: Prince Castle LLC, Carol Stream, IL (US)

(72) Inventors: Marcus Frio, St Charles, IL (US); Glenn Schackmuth, Oswego, IL (US); Donald Sweeney, St Chalres, IL (US); Richard Bauer, Palatine, IL (US); Michael Infanger, Park Ridge, IL (US); Michael A. Carvajal, Chicago, IL (US); Luigi Zevola, Chicago, IL (US); Fausto Annicchiarico Petruzzelli, Chicago, IL (US); Scott Rote, Mokena, IL (US); Yuri Gallegos, Carol Stream, IL (US); Sean Forrest, Carol Stream, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 0 days.

(21) Appl. No.: 16/455,120

(22) Filed: Jun. 27, 2019

(65) Prior Publication Data
US 2020/0000284 A1    Jan. 2, 2020

Related U.S. Application Data

(60) Provisional application No. 62/690,787, filed on Jun. 27, 2018.

(51) Int. Cl.
*A47J 37/08* (2006.01)
*A23L 5/10* (2016.01)
*A47J 27/14* (2006.01)

(52) U.S. Cl.
CPC ............. *A47J 37/0864* (2013.01); *A23L 5/15* (2016.08); *A47J 27/14* (2013.01); *A47J 37/085* (2013.01); *A23V 2002/00* (2013.01)

(58) Field of Classification Search
CPC ...... A47J 37/0864; A47J 27/14; A47J 37/085; A23L 5/15
See application file for complete search history.

(56) References Cited

U.S. PATENT DOCUMENTS

| 3,183,856 A | 5/1965 | Jolly |
| 3,266,442 A | 8/1966 | Udall et al. |

(Continued)

FOREIGN PATENT DOCUMENTS

| CA | 2923038 A1 | 12/2015 |
| CN | 105608794 | 5/2016 |

(Continued)

OTHER PUBLICATIONS

International Search Report and Written Opinion for corresponding International Application PCT/US2019/039543, dated Oct. 8, 2019.

(Continued)

*Primary Examiner* — Steven N Leff
(74) *Attorney, Agent, or Firm* — Andrus Intellectual Property Law, LLP

(57) ABSTRACT

Systems and methods of bun holding and toasting use a bun dispenser and a toaster. The bun dispenser includes a bun holding cabinet in which a plurality of buns are held on shelves and each of the shelves include conveyors. A shuttle of the bun dispenser translates within at least one axis to align the shuttle with a shelf to receive a bun. A dispensing shelf of the bun dispenser receives the bun from the shuttle. A toaster receives the bun from the dispensing shelf and operates to toast the bun and dispense the toasted bun at a predetermined location.

19 Claims, 7 Drawing Sheets

(56) References Cited

U.S. PATENT DOCUMENTS

| | | |
|---|---|---|
| 3,343,715 A | 9/1967 | Edwards |
| 3,377,963 A * | 4/1968 | Anderson ............. A22C 7/00 99/348 |
| 3,517,605 A | 6/1970 | Hursch et al. |
| 3,915,316 A | 10/1975 | Pomara, Jr. |
| 4,006,831 A | 2/1977 | Jimenez |
| 4,034,661 A | 7/1977 | Boosalis et al. |
| 4,054,015 A | 10/1977 | Rowell |
| 4,261,257 A | 4/1981 | Henderson et al. |
| 4,503,502 A | 3/1985 | Chapin |
| 4,530,632 A | 7/1985 | Sela |
| 4,547,851 A | 10/1985 | Kurland |
| 4,553,222 A | 11/1985 | Kurland et al. |
| 4,620,826 A | 11/1986 | Rubio et al. |
| 4,677,888 A | 7/1987 | Terrangnoli |
| 4,760,777 A | 8/1988 | Welsh |
| 4,797,818 A | 1/1989 | Cotter |
| 4,919,950 A | 4/1990 | Mak |
| 4,922,435 A | 5/1990 | Cahlander et al. |
| 4,944,218 A | 7/1990 | Cresson |
| 5,000,345 A | 3/1991 | Brogna et al. |
| 5,127,544 A * | 7/1992 | Robinson ............. G07F 9/105 221/121 |
| 5,132,914 A | 7/1992 | Cahlander et al. |
| 5,172,328 A | 12/1992 | Cahlander et al. |
| 5,253,762 A | 10/1993 | Duncan |
| 5,493,958 A * | 2/1996 | Naramura ............. A21C 15/02 99/325 |
| 5,540,943 A | 7/1996 | Naramura |
| 5,546,848 A | 8/1996 | Naramura |
| 5,562,183 A | 10/1996 | Naramura |
| 5,724,886 A | 3/1998 | Ewald et al. |
| 5,755,149 A | 5/1998 | Blanc et al. |
| 5,763,861 A | 6/1998 | Herrera et al. |
| 6,236,974 B1 | 5/2001 | Kolawa et al. |
| 6,298,331 B1 | 10/2001 | Walker et al. |
| 6,473,739 B1 | 10/2002 | Showghi et al. |
| 6,585,477 B1 | 7/2003 | Lawrence |
| 6,647,864 B1 | 11/2003 | Fang |
| 6,704,616 B2 | 3/2004 | Formon |
| 6,751,525 B1 | 6/2004 | Crisp, III |
| 6,930,296 B2 | 8/2005 | Chen |
| 7,092,988 B1 | 8/2006 | Bogatin et al. |
| 7,110,964 B2 | 9/2006 | Tengler et al. |
| 7,141,258 B2 | 11/2006 | Hillmann |
| 7,183,518 B2 | 2/2007 | Near et al. |
| 7,353,136 B2 | 4/2008 | Vock et al. |
| 7,478,749 B2 | 1/2009 | Clothier et al. |
| 7,493,362 B2 | 2/2009 | Bogatin et al. |
| 7,757,602 B2 | 7/2010 | Aubry et al. |
| 7,885,852 B2 | 2/2011 | Banerjee et al. |
| 8,307,951 B2 | 11/2012 | Sus et al. |
| 8,428,775 B2 | 4/2013 | Baker et al. |
| 8,448,567 B2 | 5/2013 | Martin et al. |
| 8,458,311 B2 | 6/2013 | Jang et al. |
| 8,498,896 B2 | 7/2013 | Banerjee et al. |
| 8,925,744 B1 | 1/2015 | Jang et al. |
| 9,049,875 B2 | 6/2015 | Ewald et al. |
| 9,066,627 B2 | 6/2015 | Baranowski et al. |
| 9,090,446 B2 | 7/2015 | Crisp, III |
| 9,295,282 B2 | 3/2016 | Vardakostas et al. |
| 9,326,544 B2 | 5/2016 | Vardakostas et al. |
| 9,327,958 B2 | 5/2016 | Angus et al. |
| 9,532,575 B1 | 1/2017 | Don, I et al. |
| 9,585,401 B2 | 3/2017 | Wiker et al. |
| 9,652,756 B2 | 5/2017 | Knecht et al. |
| 9,701,530 B2 | 7/2017 | Kline et al. |
| 9,718,568 B2 | 8/2017 | Vardakostas et al. |
| 9,770,049 B2 | 9/2017 | Vardakostas et al. |
| 9,788,687 B2 | 10/2017 | Frehn et al. |
| 9,805,351 B2 | 10/2017 | Harman |
| 9,878,867 B2 | 1/2018 | Yamamiya |
| 10,067,109 B2 | 9/2018 | Frehn et al. |
| 10,068,273 B2 | 9/2018 | Frehn et al. |
| 10,086,525 B2 | 10/2018 | Engel-Hall et al. |
| 2002/0059859 A1 | 5/2002 | Verklan |
| 2003/0078793 A1 | 4/2003 | Toth |
| 2004/0083201 A1 | 4/2004 | Sholl et al. |
| 2004/0107141 A1 | 6/2004 | Conkel et al. |
| 2004/0143503 A1 | 7/2004 | Suthar |
| 2004/0238555 A1 | 12/2004 | Parks |
| 2005/0049940 A1 | 3/2005 | Tengler et al. |
| 2005/0182680 A1 | 8/2005 | Jones, III et al. |
| 2007/0251521 A1 | 11/2007 | Schackmuth et al. |
| 2008/0163762 A1 | 7/2008 | Weiss |
| 2008/0319864 A1 | 12/2008 | Leet |
| 2009/0070229 A1 | 3/2009 | Ansari et al. |
| 2009/0152345 A1 | 6/2009 | Johnson |
| 2010/0049578 A1 | 2/2010 | Salerno |
| 2010/0274633 A1 | 10/2010 | Scrivano et al. |
| 2012/0143730 A1 | 6/2012 | Ansari et al. |
| 2014/0324607 A1 | 10/2014 | Frehn |
| 2014/0330686 A1 | 11/2014 | Kulasooriya et al. |
| 2015/0013550 A1 | 1/2015 | Lin |
| 2015/0019354 A1 | 1/2015 | Chan et al. |
| 2015/0187027 A1 | 7/2015 | Lowe |
| 2015/0199667 A1 | 7/2015 | Fernando et al. |
| 2016/0026958 A1 | 1/2016 | Lee |
| 2016/0183728 A1* | 6/2016 | Vardakostas et al. ............. A21C 15/002 426/466 |
| 2016/0235239 A1 | 8/2016 | Patadia |
| 2016/0236367 A1 | 8/2016 | Engel-Hall et al. |
| 2016/0244311 A1 | 8/2016 | Burks et al. |
| 2016/0253084 A1 | 9/2016 | Deville et al. |
| 2016/0330982 A1 | 11/2016 | Frehn et al. |
| 2016/0338545 A1 | 11/2016 | Shah et al. |
| 2016/0379293 A1 | 12/2016 | Barajas Gonzalez et al. |
| 2017/0018041 A1 | 1/2017 | Fox |
| 2017/0024789 A1 | 1/2017 | Frehn et al. |
| 2017/0065117 A1 | 3/2017 | Reese et al. |
| 2017/0116661 A1 | 4/2017 | Sundaram |
| 2017/0208940 A1 | 7/2017 | Boudreault |
| 2017/0215631 A1 | 8/2017 | Studor et al. |
| 2017/0258257 A1 | 9/2017 | Guh |
| 2017/0280763 A1 | 10/2017 | Nazarian et al. |
| 2018/0186022 A1 | 7/2018 | Fox et al. |

FOREIGN PATENT DOCUMENTS

| | | |
|---|---|---|
| DE | 2459479 | 7/1976 |
| DE | 2535484 | 2/1986 |
| DE | 102005012536 | 9/2006 |
| DE | 102015113398 | 2/2017 |
| EP | 296496 | 12/1988 |
| EP | 777201 | 6/1997 |
| EP | 1337170 | 3/2007 |
| WO | 199109558 | 7/1991 |
| WO | 2009120262 | 10/2009 |
| WO | 2013184910 | 12/2013 |
| WO | 2015134439 | 9/2015 |
| WO | 2016079610 | 5/2016 |
| WO | 2017136605 | 8/2017 |
| WO | 2017177041 | 10/2017 |
| WO | 2019113070 | 6/2019 |
| WO | 2020006257 | 1/2020 |

OTHER PUBLICATIONS

International Search Report and Written Opinion issued in corresponding PCT Application No. PCT/US2018/063846, dated Mar. 21, 2019.

International Search Report and Written Opinion for PCT/US2020/025927, dated Jun. 29, 2020.

* cited by examiner

_US 11,129,498 B2_

SYSTEMS AND METHODS OF FOOD PREPARATION AUTOMATION

CROSS-REFERENCE TO RELATED APPLICATIONS

The present application claims priority of U.S. Provisional Patent Application No. 62/690,787, filed on Jun. 27, 2018, the contents of which is hereby incorporated by reference in its entirety.

BACKGROUND

The present disclosure relates to the field of food preparation. More specifically, the present disclosure relates to methods of food preparation and order assembly in a restaurant or food service setting. Systems, including, but not limited to a preparation table and associated equipment that facilitate these tasks are also disclosed herein.

Many restaurant and food service settings, particularly quick service restaurants (QSR) use a combination of pre-prepared and on-demand prepared food components in order to assemble foods or ordered by customers, for example, hamburgers or sandwiches within a customer's time expectation. While one approach to order assembly would be to sequentially prepare each food component on demand in the order in which it is needed, customer food preparation time expectations are not met with such an approach.

Additionally, as menu options and accommodation of customer special requests or customizations proliferate, management of a greater number and variety of order components is needed. Management of prepared food component inventory is more challenging as the number of food components increases. Also, as order assembly becomes more complicated, the assembly instructions are harder for food preparation workers to remember and correctly follow and further create a greater learning curve for new or inexperienced workers or for the introduction of new menu items.

Bread, rolls, or other baked goods commonly form the structure on or within which the substance of a sandwich or other food item is held. Sandwiches, including hamburgers, club sandwiches, open-faced sandwiches, and wrap sandwiches are commonly prepared foods in restaurants and kitchens. In the QSR, fast casual restaurant, or institutional kitchen setting, handling (and toasting, if necessary) of the baked good can take nearly half of the total time required to prepare the ordered sandwich. As a further challenge, if left exposed, baked goods can quickly become stale, prone to mold, or otherwise degrade in flavor.

Baked goods are often partitioned into slices or halves for thermal treatment, for example, toasting and/or for use in assembling a sandwich. Baked goods can be sliced on demand, but this adds time and complexity to sandwich assembly processes. Baked goods can be provided pre-sliced, although if held separately once sliced, the interior of the baked good is susceptible to degradation when exposed to air. Therefore, baked goods are often supplied in a pre-sliced, but complete condition. This adds a further challenge in that the partitioned pieces of the baked good must be separated and directed for individual treatment in the sandwich assembly process. There is a trend in restaurants and food service for increased menu options and for the accommodation of further customer custom requests. This adds to the complexity of food item orders and food service workers are less able to rely on memorization of food item recipes to assemble the order. Increased menu options and custom accommodations further contribute to slow the assembly of these food items. Automation can provide solutions in this area. There are existing examples of prep lines in which some or all of the process is automated. One example of an automated prep line is disclosed in U.S. Pat. No. 10,068,273 to Frehn, et al. entitled "Method for Delivering a Custom Sandwich to a Patron." Other systems automate a portion of a prep line and could be used with other manual or automated prep line systems, one example of this is the Applicant's own Patent Application Publication No. 2019/0167040, entitled, "Baked Good Handling System," and which is incorporated by reference herein in its entirety.

Therefore, restaurants and food service industries can benefit from systems and methods that improve worker productivity, worker accuracy, and faster completion of customized food orders.

BRIEF DISCLOSURE

An example of a system of bun holding and toasting includes a bun dispenser and a toaster. The bun dispenser includes a bun holding cabinet in which a plurality of buns are held on shelves and each of the shelves include conveyors. A shuttle of the bun dispenser translates within at least one axis to align the shuttle with a shelf to receive a bun. A dispensing shelf of the bun dispenser receives the bun from the shuttle. A toaster receives the bun from the dispensing shelf and operates to toast the bun and dispense the toasted bun at a predetermined location.

The system of bun holding and toasting may further include each of the shelves are configured to hold a plurality of rows of buns. Each row of buns may be arranged in the direction of travel of the conveyors. The bun dispenser may receive an instruction of a requested bun and then the shuttle may operate to translate within at least one axis to align the shuttle with a predetermined bun based upon the instruction. The shuttle may translate in two axes to align the shuttle with at least one row of buns based upon the instruction. The bun dispenser may include a plurality of gates. Each gate of the plurality may be associated with a row of buns. The plurality of gates are operated to permit the predetermined bun advance from the shelf into the shuttle. The plurality of gates may be located in the shuttle. The shuttle may be part of an elevator and the shuttle translates along a track of the elevator under power from at least one motor. The track of the elevator may have one or more channels within which the shuttles translate. The holding cabinet may include two sections of each shelf. Each shelf may be configured to hold and dispense a different type of bun from the other shelf section. Each shelf section may include a different conveyor. The shuttle may be a first shuttle and the elevator includes a second shuttle. The first shuttle may translate along a first channel of the track and the second shuttle may translate along a second channel of the track.

Examples of the system of bun holding and toasting my further include that the shuttle includes a conveyor and the conveyor of the shuttle operates to advance the bun received by the shuttle onto the dispensing shelf. The dispensing shelf includes a conveyor that moves the bun to a bun separator that operates to separate the bun into at least two portions and directs the separated bun portions into the toaster. The toaster may include a queuing conveyor that receives toasted bun portions and directs the toasted bun portions to a staging location. The toaster may include at least one bun flipper and all of the toasted bun portions are arranged crumb-side up on the queuing conveyor. At least one sensor may detect a position of a toasted bun portion and the toaster operates to dispense a subsequent toasted bun portion from the staging location with the queuing conveyor based upon the signal from the sensor. The bun dispenser and the toaster may be part of an automated sandwich preparation system.

An example of a method of bun holding and toasting includes receiving a selection of a bread product at a bun dispenser. The bun dispenser includes a bun holding cabinet in which a plurality of buns are held on shelves and each of the shelves includes conveyors. A shuttle of the bun holding cabinet translates within at least one axis to align the shuttle with a shelf to receive a bun based upon the selection received at the bun dispenser. The bun is received at a dispensing shelf from the shuttle. The bun is received at a toaster from the dispensing shelf. The bun is toasted with the toaster. The toasted bun is dispensed at a predetermined location.

In additional examples of the present method of bun holding and toasting include advancing the bun with the conveyor of the comprising the bun to position the bun on the shuttle The bun is advanced from the shuttle to the dispensing shelf with a conveyor associated with the shuttle. The bun is received from the shuttle onto the conveyor of the dispensing shelf. The bun is advanced with the conveyor of the dispensing shelf to a bun separator. The bun separator separates the bun into at least two bun portions. The toasted bun portions may be received on a queuing conveyor. The toasted bun portions may be queued on the queuing conveyor. A condition of the dispensing location may be sensed with at least one sensor. Based upon the sensed condition, operating the conveyor to dispense a toasted bun portion to the dispensing location. A toasting instruction may be received for the bread products at the toaster. The toaster may be adjusted based upon the toasting instructions.

DETAILED DISCLOSURE

Figure 1:
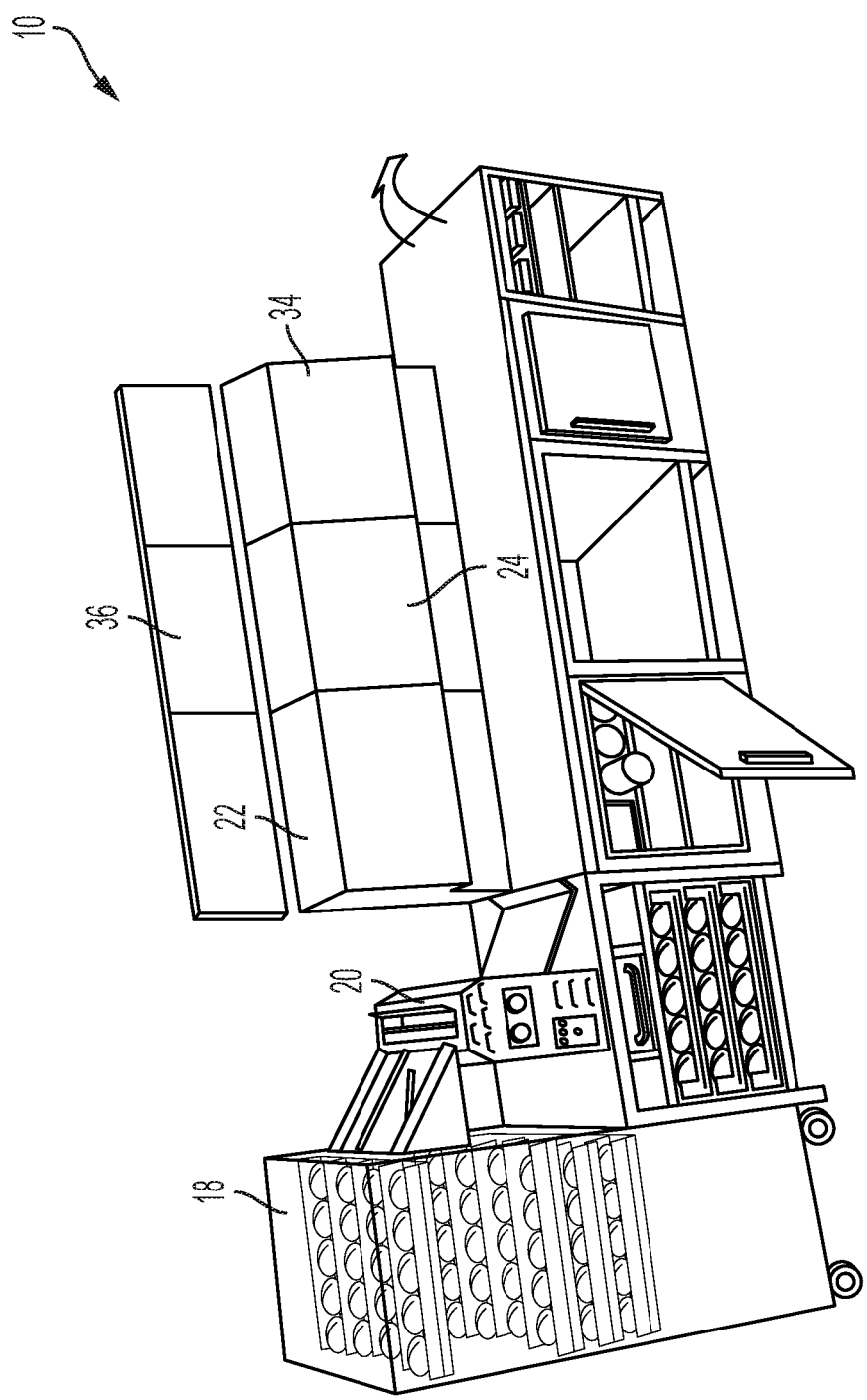
FIG. 1 depicts an exemplary embodiment of a prep line.

FIG. 1 depicts an exemplary embodiment of a prep line 10. In the example used herein, the prep line 10 is configured to assemble a sandwich, for example, a hot sandwich like a hamburger or a chicken sandwich. Hamburgers or chicken sandwiches are common foods prepared in a quick service restaurant (QSR) setting. The prep line 10 exemplarily includes a bun dispenser 18, a toaster 20, a sauce station 22, a condiment station 24, and a protein station 34. It will be recognized that other components, for example, but not limited to a packaging dispenser, may be included within the scope of this disclosure and the configuration of the prep line 10. It will be recognized that in embodiments, some or all of these parts of the prep line 10 may be manually operated stations where a food service worker completes any associated order assembly tasks, or that these stations may be automated machines that perform the associated order assembly tasks. A graphical display 35 is associated with one or more of these stations and presents information regarding the received customer orders, the completion of the orders, and/or other information for example inventory or staffing information.

Figure 2:
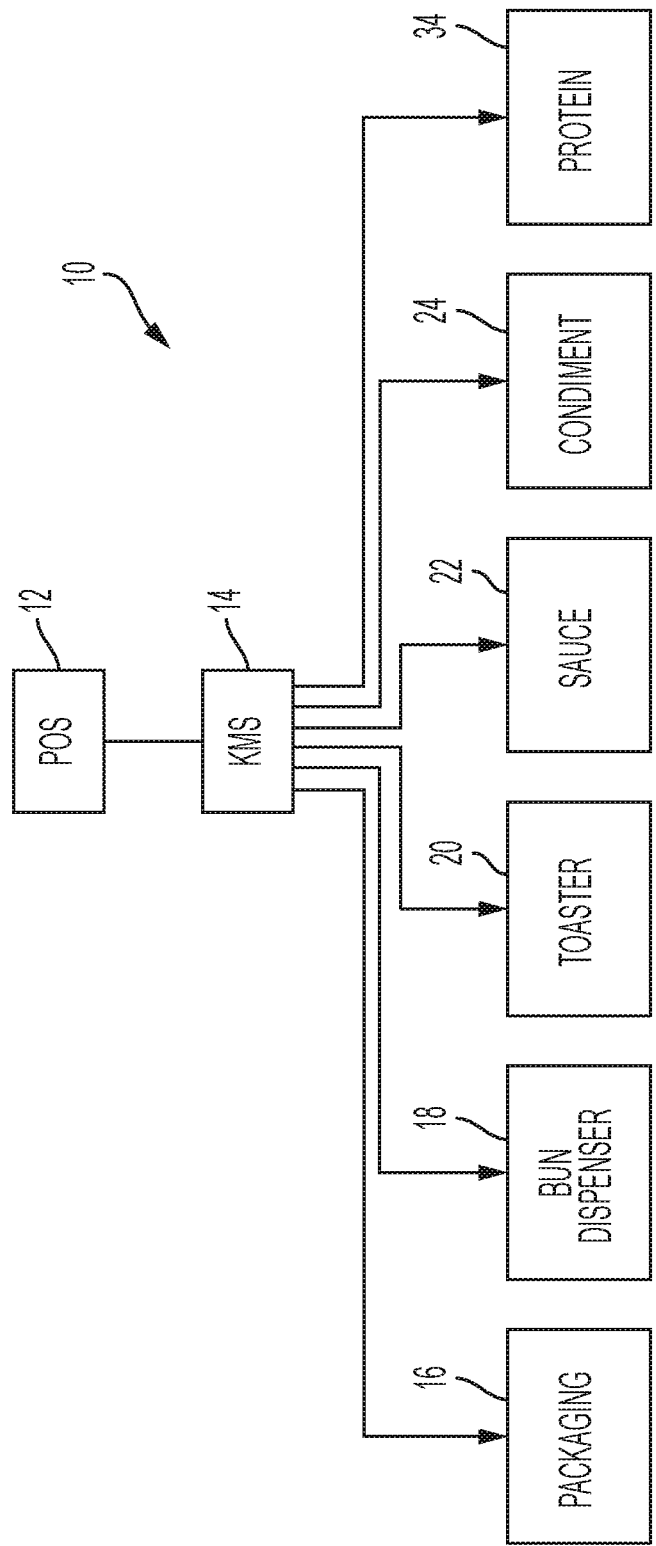
FIG. 2 is a system diagram of an exemplary embodiment of an automated prep line system.

FIG. 2 is a system diagram that depicts an example of the prep line 10 in an automated implementation. The automated prep line 10 exemplarily includes sub-systems or components that operate in a coordinated manner to automatedly perform some or all of the steps in the assembly of a food product, for example, a sandwich. The components of the prep line 10 as shown in FIG. 2 are communicatively connected through a kitchen management system (KMS) 14. As exemplarily provided herein, a sandwich includes a toasted bun, sauce, condiment, and protein. It will be recognized that the specific ingredients and order of sandwich assembly may be different than that as described herein, while still remaining within the present disclosure.

In the embodiment of the automated prep line 10 as depicted in FIGS. 1 and 2, a customer order is exemplarily received from a point of sale (POS) system 12. The customer order identifies one or more food products requiring assembly to complete the order. The customer order is exemplarily provided to a KMS 14 that identifies the components of each of the food products in the customer order and also exemplarily tracks, manages, and coordinates kitchen inventory and the order in which food products are processed. In doing so, the KMS 14 can provide control signals to each of the devices in prep line 10, and any other communication-enabled devices in the kitchen. The bun dispenser 18 and the toaster 20 are both communicatively connected to the KMS 14 to receive these instructions of the customer orders and the baked goods needed for the incoming orders. The KMS may be similarly communicatively connected to some or all of the devices associated with the packaging station 16, sauce station 22, condiment station 24, or protein station 34. In embodiments, the KMS 14 may be directly connected to one or more of these components. In other embodiments, an internet-of-things (IoT) communications system may be intermediate to the POS system 12, the KMS 14, and the components of the prep line 10. The IOT communications system may include one or more communication gateways that manage the distributed communication to the plurality of component devices and to any other communication enabled devices in the restaurant While the POS system 12 and the KMS 14 are depicted as separate systems, it will be recognized that the POS system 12 and the KMS 14 may be provided as a single integrated system. The POS system 12 and the KMS 14 may be provided locally to the rest of the prep line 10, but may also be provided wholly or partially from a remote location, for example through a networked or cloud-computing enabled implementation. The POS system 12 and the KMS 14 can be implemented on any of a variety of known controller circuits, integrated circuits, microcontrollers, microprocessors, and associated circuitry. The POS system 12 and the KMS 14 may exemplarily be implemented by a central processing unit (CPU) and integrated memory. The CPU exemplarily includes a processor that accesses software or firmware in the form of computer readable code stored on a non-transient computer-readable medium as either integrated memory or external memory. The processor executes the computer readable code as an instruction set to carry out the functions as described herein. It will be recognized that the communication enabled kitchen devices, including, but not limited to the bun dispenser 18 and the toaster 20 as disclosed in further detail herein, similarly includes such a CPU and integrated memory to receive the instructions and to operate the other components of the system to carry out the functions as described herein.

Figure 4:
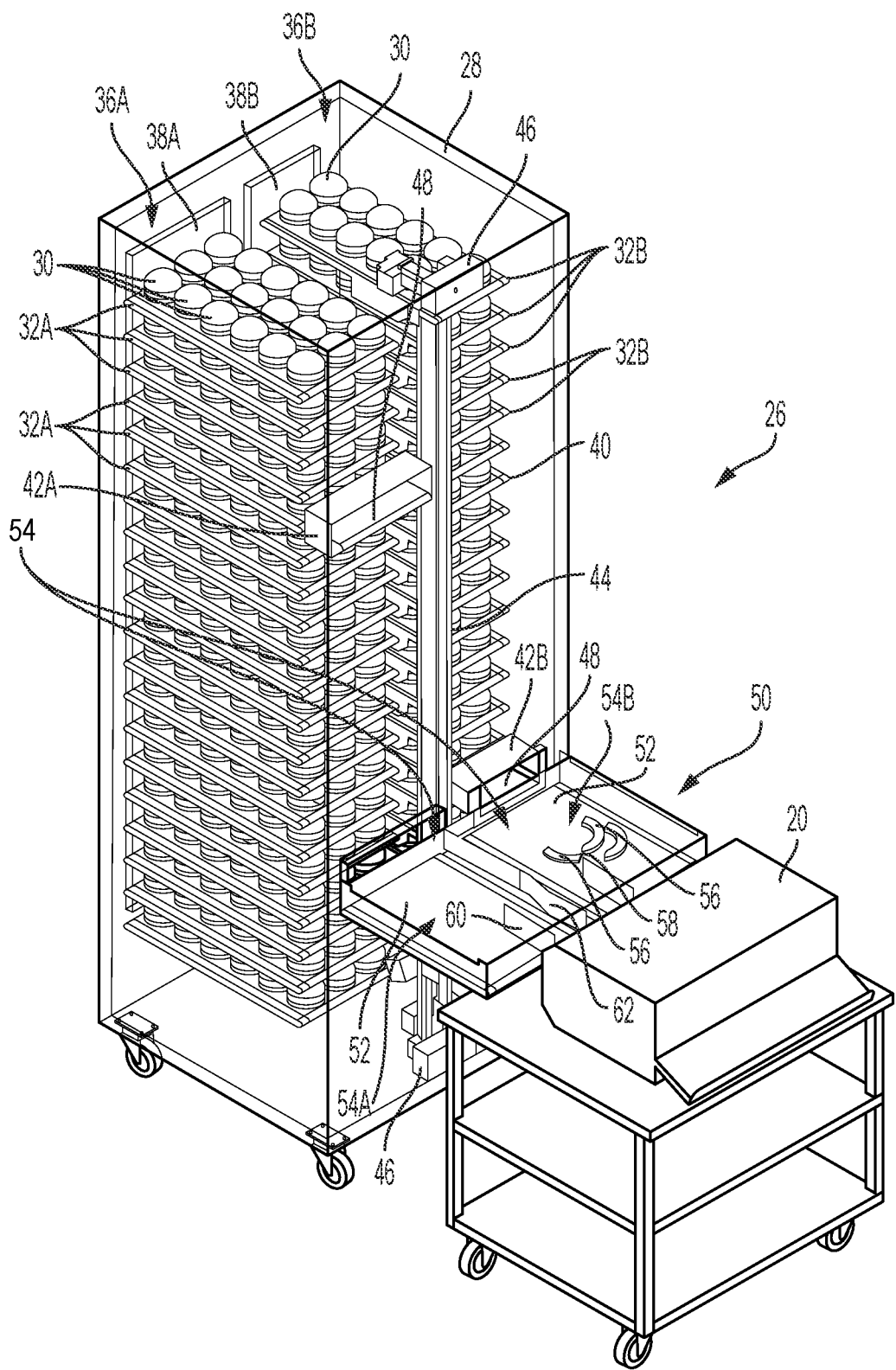
FIG. 4 depicts an exemplary system for bun holding and toasting.

Food item orders are exemplarily received at the POS system 12. The interface to the POS system 12 may be a register computer operated by a cashier, a drive-through ordering system, or an online ordering system, or any other point of sale order entry arrangement as will be recognized by a person of ordinary skill in the art in view of the present disclosure. In operation, the POS system 12 receives the customer order, for example of a cheeseburger sandwich, and provides the order to the KMS 14. The KMS 14 identifies that the ordered cheeseburger sandwich requires a sesame seed roll. This instruction is provided to the bun dispenser 18. The KMS 14 may further identify that the sesame roll is to be toasted. This instruction is provided to the toaster 20. FIG. 4 depicts an exemplary system 26 for bun holding and toasting. The system 26 exemplarily includes a bun dispenser 18 and a toaster 20. The bun dispenser 18 and the toaster 20 are communicatively connected to the KMS as described above and therefore receive an instruction or command therefrom to toast a selected type of bun.

The bun dispenser 18 includes a holding cabinet 28. The bun holding cabinet 28 defines an enclosed area within which a plurality of buns 30 are held. The buns 30 are arranged on a plurality of shelves 32 which each include conveyors. Each shelf may further support a plurality of buns 30 arranged in rows. Each shelf 32 may include a conveyor associated with each row of buns 30 or may include a single conveyor for multiple rows of buns. The rows may be in alignment with a direction of travel of an associated conveyor. In the event of a conveyor associated with multiple rows of buns, then gates or doors may control the movement of a single bun as described in further detail herein.

Figure 5:
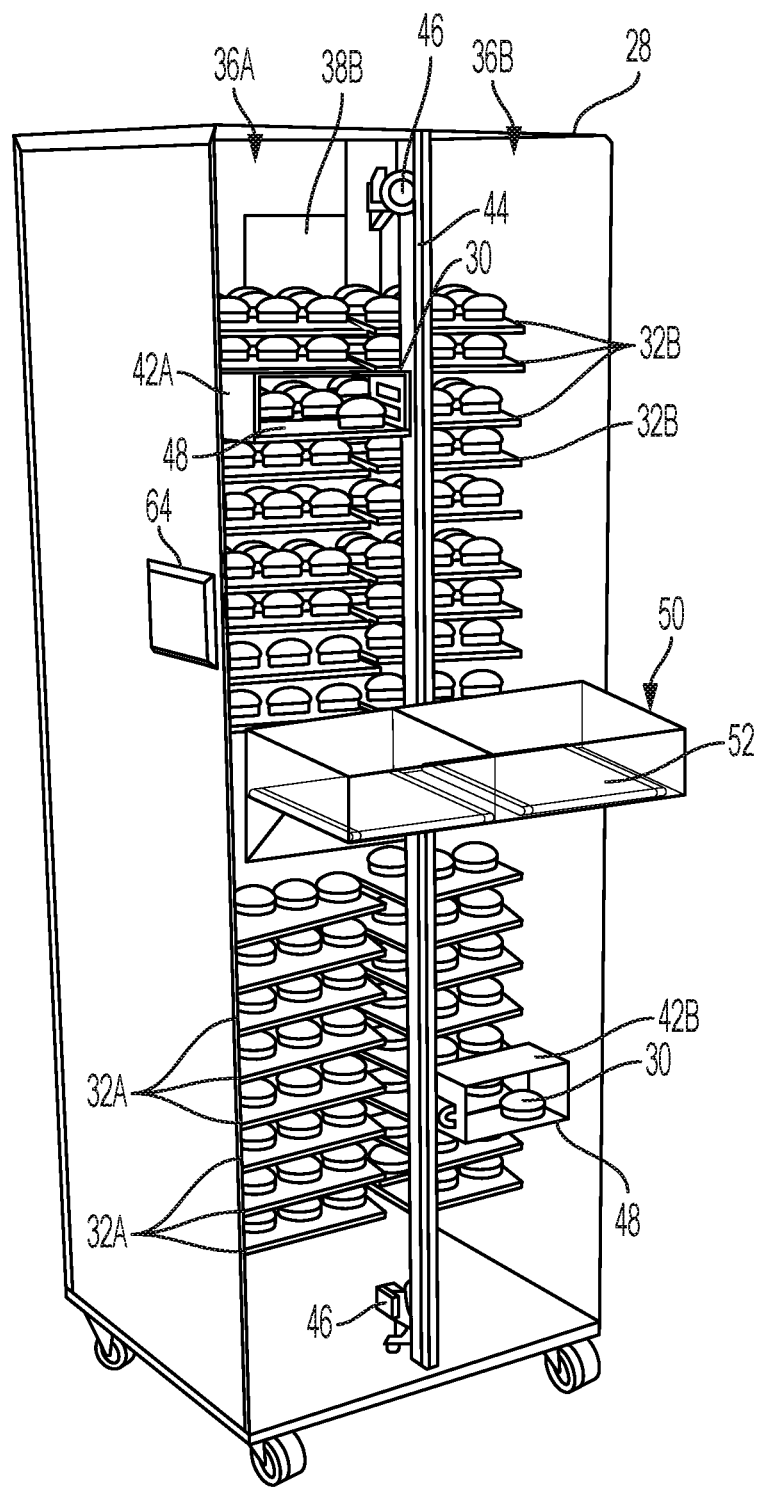
FIG. 5 depicts an exemplary bun holding cabinet.

The holding cabinet 28, which is also depicted in FIG. 5, may be physically divided, for example with a wall, or otherwise arranged to hold and dispense two, or more, different kinds of buns 30. The holding cabinet 28 may be divided into two different sections 36A, 36B, wherein each holds a different kind of bun 30A, 30B. Section 36A may be accessible through a door 38A through which the buns 30A may be loaded. Section 36B is similarly accessible through a door 38B through which the buns 30B are loaded. In a merely exemplary embodiment, the bun 30A is a sesame seed bun and bun 30B is a club bun. The holding cabinet 28 may exemplarily provide more space or volume for one of the sections 36A over the other section 36B, and which such larger volume section may be used to store and dispense the type of bun with a larger volume of use within the restaurant.

The holding cabinet 28, includes an elevator 40. The elevator 40 collects a selected bun 30 held within the holding cabinet 28 and delivers the bun 30 to a dispensing shelf 50. The elevator 40 includes a shuttle 42A, 42B associated with each of the respective sections 36A, 36B. The shuttles 42A, 42B move vertically within the holding cabinet 28 along a track 44. The track 44 may have a variety of engagement features along which the shuttles 42A, 42B translate. In an exemplary embodiment, the track 44 includes channels that are engaged by the shuttles 42A, 42B. Motors 46 operate to move the shuttles 42A, 42B along the track 44. While FIGS. 4 and 5 depict an elevator 40 that moves the shuttles 42A, 42B along a single vertical axis. In other embodiments, the elevator 40 may operate to move a shuttle or shuttles in two axes. Such two-axis shuttles may include articulable arms that each extend to provide two axes of coordinated movement. In such an embodiment, a single shuttle could service both sections 36A, 36B of the holding cabinet 28. Alternatively, separate two-axis shuttles could service each section 36A, 36B.

In operation, the bun holding cabinet receives an indication of a selected bun 30. The indication of the selected bun 30 may come through a graphical display 63 which operates to present a graphical user interface. A food service worker may interact with the GUI to provide a selection of a bun to be dispensed and/or toasted. Alternatively, the indication may be received by the bun holding cabinet 28 from the KMS as described above. The bun holding cabinet 28 receives the instruction at a CPU of the bun holding cabinet 28. The bun holding cabinet 28 operates the shuttle 42 associated with the holding cabinet section 36 of the selected bun 30 to align the shuttle 42 with the shelf 32 from which the bun will be dispensed. The conveyor associated with the selected bun 30 is then operated by the bun holding cabinet to advance the selected bun 30 onto the shuttle 42. By controlling the shelves from which subsequent buns are dispensed within a section 36 of the holding cabinet 28, the holding cabinet can operate on a first-in-first-out (FIFO) inventory control system. As the conveyor of the shelf 32 operates to advance the buns 30 onto the shuttle 42, doors or gates (not depicted) either associated with each shelf or with the shuttle can block buns from rows of buns of the shelf 32 that are not being dispensed. The conveyor can slide beneath the buns 30 of these rows while advancing the row of buns from an unblocked row until the foremost bun of that row has been advanced onto a conveyor 48 of the shuttle 42. The elevator 40 moves the shuttle 42 into alignment with the dispensing shelf 50 and then operates the conveyor 48 to advance the bun onto the dispensing shelf 50.

The dispensing shelf 50 may be arranged to be gravity based or to be powered and directs the bun 30 into the toaster 20. A gravity-based dispensing shelf 50 may extend at a downward angle from the shuttle 42 to the toaster 20. As depicted in FIGS. 4 and 5, the dispensing shelf may include a conveyor 52 that advances the bun away from the holding cabinet 28 towards the toaster 20. Buns used in a restaurant often come pre-sliced, but the slices of bun tend to fuse during transport and holding from the bakery. A bun separator 54 places a force on the bun to separate the bun slices apart for toasting. Two examples of bun separators 54 are depicted in FIG. 4 although it will be recognized that other mechanisms or arrangements may also be used to split buns.

Buns can be separated, as in the case of the club bun separator 54B by placing opposed lateral forces against the different bun slices. The club bun separator 54B includes three fingers 56 that each engage one of the sections of the club bun. The fingers 56 rotate about a pivot point 58 to place the opposing forces against each section of the club bun. As will be explained, this can further direct the club section of the bun into a dedicated location in the toaster 20. Buns can also be separated by placing a compressive force on the bun from the sides. This is exemplarily performed by separator 54A which includes a vertically-oriented conveyor 60 which pulls the bun through a restriction formed between the vertically-oriented conveyor 60 and a wall 62.

Figure 6:
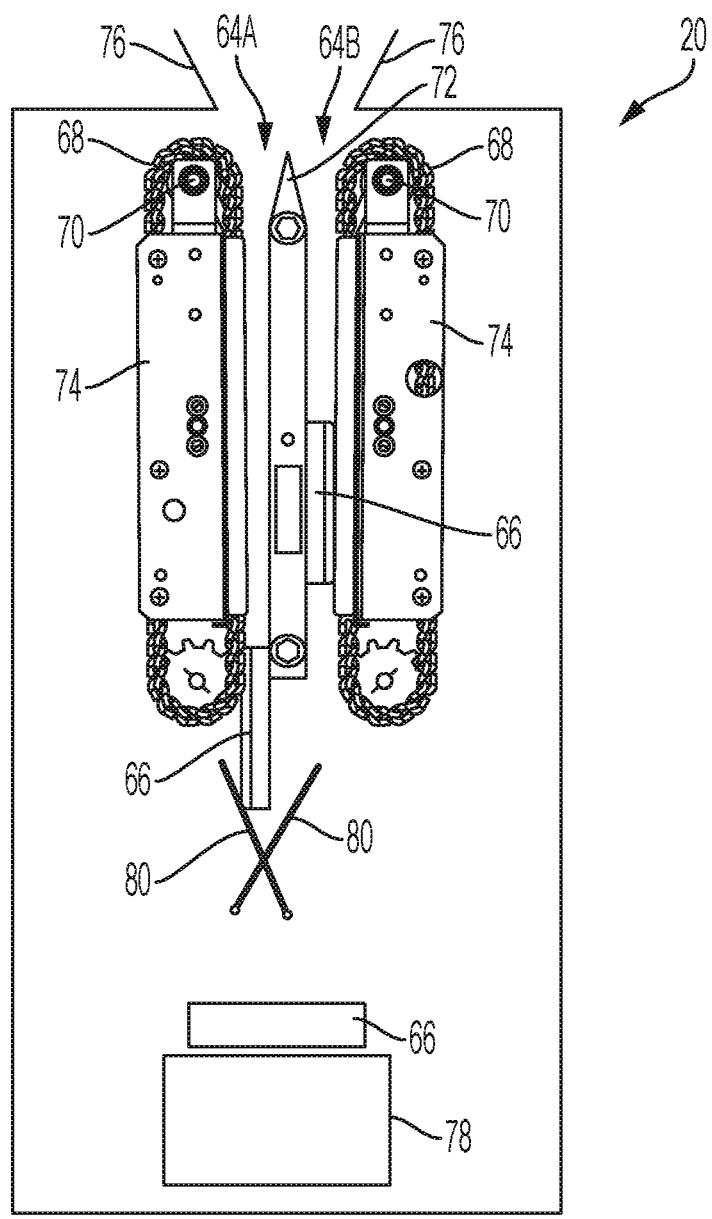
FIG. 6 is a cut-away side view of an example of a toaster.
Figure 7:
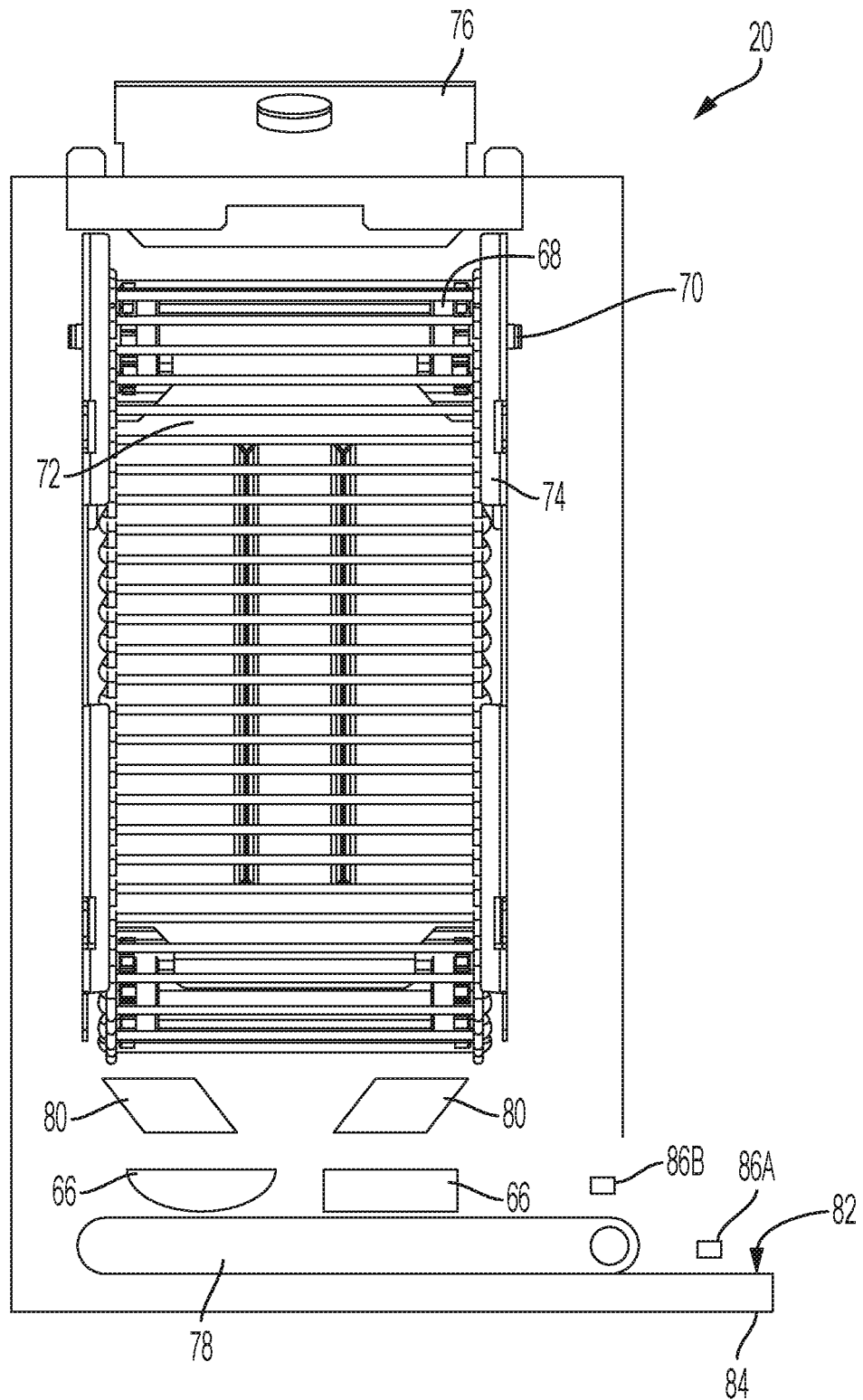
FIG. 7 is a cut-away front view of the example of the toaster.

The separated buns are directed into the toaster 20. A variety of toasters 20 can be used within the disclosed systems 26. While FIG. 4 depicts a horizontal toaster 20, FIGS. 6 and 7 depict a vertical toaster 20. Toasters 20 may have dedicated toasting systems or lanes within them arranged to settings or configurations to toast a particular bun. In other embodiments, the toaster may be an adjustable toaster with the ability to be adjusted either manually or automatedly to accommodate a variety of buns or levels of toasting. The toaster 20 may receive order information regarding the bun to be toasted and or the specific settings for the toasting operation into a CPU of the toaster 20. Such information may be entered by a food service worker through a user interface or communicatively received from the KMS as described above. The toaster 20 then operates to adjust the mechanics of the toaster, for example, the belt tensions, belt spacing, or belt speed in order to achieve the desired toasting outcome. Non-limiting examples of adjustable toasters are provided in the applicants co-pending US Application Publication No. 2018/0289209, entitled "Toaster with Adjustable Conveyor" which is incorporated herein by reference.

FIG. 6 is a cut-away side view of an example of a toaster 20 arranged vertically, while FIG. 7 is a cut-away front view of the toaster 20. The toaster 20 is exemplarily arranged with two toasting paths 64A, 64B wherein each path can receive a bun slice 66 (e.g. a crown or a heel of the bun) and a belt 68 rotated by a drive gear 70 drags the bun slice 66 across a heated platen 72 to toast the bun slice 66. The belt 68 may be constructed of silicone or metal wire, or other materials as will be recognized by those of skill in the art. FIG. 7 exemplarily shows a belt 68 constructed of metal wire. As depicted in FIG. 6, a frame 74 supports the belt 68 and in an adjustable toaster, movement of the frame 74 or components associated with the frame 74 may help to carry out the adjustments to the belt tension or belt spacing as noted above. Other toaster configurations may also be used, for example, if both sides of a bun slice are to be toasted as in a club portion of a bun, then another heated platen may be positioned interior of the belt 68 and frame 74 in parallel to the heated platen 72.

The toaster 20 receives the bun slices 66 from the dispensing shelf 50 and the bun separator 54 as depicted in FIG. 4. Funnel plates 76 can help to direct the bun slices 66 into the toaster and along the associated toasting path 64A, 64B within the toaster. In embodiments, it is desirable for the toaster 20 to output the toasted bun slices 66 is a known or predetermined order at a predetermined position. This provides regularity to a food service worker who can then direct more of their attention to order assembly. Additionally, the predetermined order and predetermined position can assist other automated kitchen systems whereby a transition from the toaster to a subsequent automated step can occur from the predetermined order and predetermined position of the bun slices. This predetermined order may start with the funnel plates 76 which help to direct the separated bun slices 66 into an expected toasting path 64A, 64B. The bun slices 66 move through the toaster 20 by way of the belts 68.

The toaster 20 includes a queuing conveyor 78 that receives the bun slices 66 after each slice 66 has been toasted. Flipper arms 80 may be associated with the bottom of the belt 68 and are positioned to guide the toasted bun slices 66 from the belt 68 to the queuing conveyor 78 with a crumb side of the bun slice 66 pointed upwards. The crumb side is the side to the interior of the bun as opposed to the baked exterior of the original bun (e.g. a club section of a bun has two crumb sides). The flipper arms 80 may pivot or rotate to enable the bun slices 66 to be moved along the queuing conveyor 78 past the flipper arms 80. In addition to ensuring that the bun slices 66 are oriented crumb side up on the queuing conveyor 78, at least one of the flipper arms 80 may further extend in a same direction as the queuing conveyor 78 and/or across the belt 68. In doing so, the flipper arm 80 can also direct the bun slices into a position along the queuing conveyor 78. In an example, this can be used to ensure that the bun slices are arranged in a particular order (e.g. heel section forward of the crown section, as depicted in FIG. 7). It will also be recognized that in examples, coordinated movement of the queuing conveyor 78 may assist in locating the bun slices 66 in the predetermined order thereon. With the bun slices 66 arranged with crumb sides up and in a predetermined order on the queuing conveyor 78, the queuing conveyor 78 can advance the bun slices 66 to an output location 82.

The output location 82 may exemplarily be an extension 84 of the toaster 20. In embodiments, the toaster 20 further includes at least one sensor 86 arranged in relation to the queuing conveyor 78 and/or the output location. The at least one sensor 86 provides information to the CPU of the toaster 20 to use in controlling the advance of the bun slices 66 out of the toaster 20. The at least one sensor 86 may be an optical sensor, a proximity sensor, a laser break sensor, a computer vision system, a pressure sensor, or other sensors which may be recognized as suitable based upon this disclosure. A sensor 86A located at an output location 82 on an extension 84 of the toaster 20 may be used to detect if there is currently a toasted bun slice at the output location 82. If a bun slice is there, an automated process may take the bun slice for further operation. Such an automated process may be a robotic arm to grip the bun slice and move it to a next device in an automated prep line. The bun slice may further be held at the output location until a food service worker takes the bun slice from the output location. If no bun slice is detected by sensor 86A, then the queuing conveyor 78 may operate to advance the bun slice 66 to the output location 82. In another embodiment, the queuing conveyor 78 may operate to dispense the toasted bun into a receptacle (e.g. box, wrapper, or plate) placed at the output location 82. The sensor 86A may detect when the receptacle is in position, while the sensor 86B operates to detect the presence of a bun slice 66 at a staging location on the queuing conveyor 78 and to stop the advance of the queuing conveyor 78 until a receptacle is in position at the output location 82.

Figure 3:
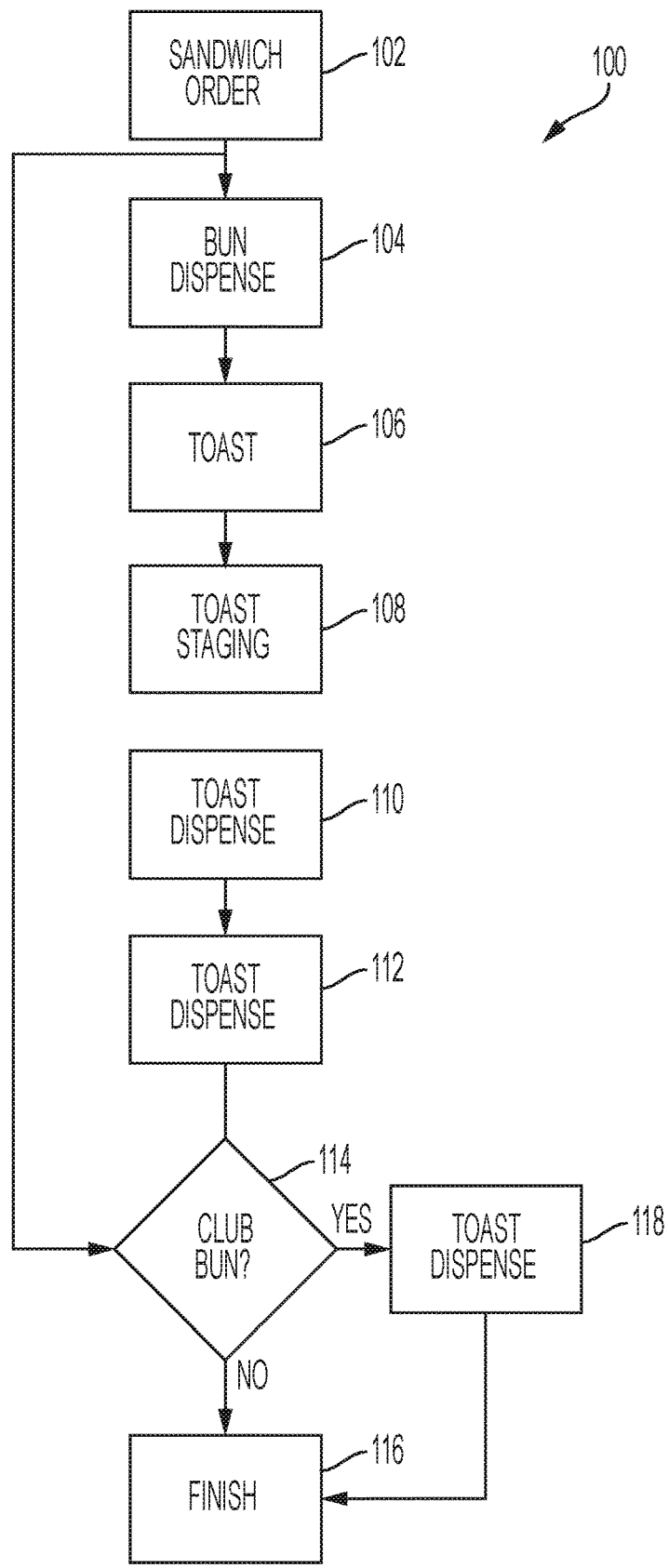
FIG. 3 is a flow chart that depicts an exemplary embodiment of a method of automated bun holding and toasting.

FIG. 3 is a flow chart that depicts an exemplary embodiment of a method 100 of bun holding and toasting. The method 100 is exemplarily explained herein with respect to the systems and apparatus described above with respect to FIGS. 4-7, although it will be recognized that other examples of systems may be used in order to carry out the method as described herein.

The method 100 begins with a sandwich order which specifies, for example, the bun, the packaging, the condiments, and the protein to complete the sandwich order. The system begins to fulfill the order by directing the bun holding cabinet to dispense the appropriate bun 104. The bun is dispensed, for example, as described above, wherein the bun holding cabinet includes a plurality of shelves, each shelf equipped with a conveyor. A shuttle is translated in at least one dimension until the shuttle is in alignment with the bun to dispense. The conveyor of the shelf advances a bun onto the shuttle. In one non-limiting example, the buns are arranged on the conveyor of the shelf in a plurality of rows and the conveyor advances all of the buns, but a gate blocks the further movement of one or more rows of buns except for the row of the bun to be dispensed. The shuttle receives the bun and translates the bun in at least one dimension until the shuttle is in a position relative to a dispensing shelf. A conveyor of the shuttle advances the bun onto a conveyor of the dispensing shelf. This conveyor moves the bun into contact with a bun separator, which separates the bun into bun portions, for example, a crown and a heel. The bun portions are delivered into the toaster.

The bun portions begin toasting at 106. The toasting process may move the bun portion through the toaster as the toasting progresses. The toasted bun portion may be deposited onto a toaster conveyor in a toast staging process at 108. Additionally, in toast staging, the toasted bun portion may be moved so as to be oriented crumb-side up on the conveyor. In a still further process in the toast staging at 108, the bun portions may be arranged in a predetermined order on the conveyor. Such ordering and flipping of the bun portions may be performed mechanically to delay or advance the position of a bun portion or to change the orientation (e.g. flip) of the bun portion. The toast staging at 108 may further continue until a bun portion is at a staging location, which may be defined by one or more sensors which detect the bun portion.

With the bun portion (e.g. crown or heel) of a known type (e.g. crown or heel), location, and orientation, the conveyor is operated at 110 to dispense the bun portion to an output location. Once at the output location, the bun portion may be removed, packaged, or moved to another stage of an automated order preparation process. With the first bun portion removed from the output location, the toaster operates at 112 for a subsequent toast dispense of the next toasted portion of the bun to the output location.

Next, a determination is made at 114 if the toasted bun is a club bun, thereby having the third club section of the bun to dispense. If the bun is not a club bun, then the dispensing process is complete at 116. If a club section is to be dispensed, the toaster waits until the previous bun portion is removed from the output location and then operates at 118 to dispense the toasted club portion.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system of bun holding and toasting:
   a bun dispenser comprising:
      a bun holding cabinet having a plurality of shelves comprising conveyors in which a plurality of buns, each bun of the plurality comprising a heel, with a crumb-side opposite an exterior side, pre-sliced from a crown, with a crumb-side opposite an exterior side, and held in a complete condition, are held in the bun holding cabinet on the shelves; and
      a shuttle that translates within at least one axis to align the shuttle with a shelf of the plurality of shelves to receive a bun from the shelf;
   a dispensing shelf that receives the bun from the shuttle;
   a bun separator on the dispensing shelf, the bun separator configured to apply a force to sides of the bun to separate the crown from the heel;
   a toaster that receives the crown of the bun and the heel of the bun from the bun separator, the toaster comprising at least one conveyor belt and at least one heated platen configured to thermally treat the crumb-side of the heel and the crumb-side of the crown, the toaster further comprising a queuing conveyor configured to receive the crown and the heel from the at least one conveyor belt and moves the crown and the heel to a predetermined location;
   wherein the bun separator further comprises at least one separator conveyor oriented vertically to the dispensing shelf, wherein the separator conveyor is configured to pull the bun through a restriction formed between the separator conveyor and a wall to impart a lateral force on the sides of the bun to separate the crown from the heel.

2. The system of claim 1, wherein each of the shelves are configured to hold a plurality of rows of buns and each row of buns is arranged in the direction of travel of the conveyors and the bun dispenser receives an instruction of a requested bun and the shuttle operates to translate within at least one axis to align the shuttle with a predetermined bun based upon the instruction.

3. The system of claim 2, wherein the shuttle translates in two axes to align the shuttle with at least one row of buns based upon the instruction.

4. The system of claim 2, wherein the bun dispenser comprises a plurality of gates, with each gate of the plurality associated with a row of buns, wherein the plurality of gates are operated to permit the predetermined bun advance from the shelf into the shuttle.

5. The system of claim 2, wherein the shuttle is part of an elevator and the shuttle translates along a track of the elevator under power from at least one motor.

6. The system of claim 5, wherein the holding cabinet comprises two sections of each shelf, each shelf section configured to hold and dispense a different type of bun from the other shelf section and each shelf section comprises a different conveyor, and wherein the shuttle is a first shuttle, and the elevator comprises a second shuttle, the first shuttle translatable along a first channel of the track and the second shuttle translatable along a second channel of the track.

7. The system of claim 1, wherein the shuttle comprises a conveyor and the conveyor of the shuttle operates to advance the bun received in the shuttle onto the dispensing shelf.

8. The system of claim 1, wherein the dispensing shelf is angled towards the toaster.

9. The system of claim 1, wherein the dispensing shelf comprises a conveyor that moves the bun in a first direction to the bun separator, and the bun separator is configured to apply the compressive force laterally to the sides of the bun relative to the first direction.

10. The system of claim 1, wherein the toaster comprises the queuing conveyor and the queuing conveyor is configured to receive the crown and the heel in a predetermined sequential order and the queuing conveyor is configured to operate in response to a signal from at least one sensor to sequentially advance the crown and the heel out of the toaster to an output location.

11. The system of claim 10, wherein the toaster comprises at least one flipper arm that extends from a position below the at least one conveyor belt to a position on an opposite side of the at least one heated platen from the at least one conveyor to direct at least one of the crown and the heel onto the queuing conveyor with theft crumb-side of the crown and the crumb-side of the heel facing away from the queuing conveyor.

12. The system of claim 11, further comprising at least one sensor that detects a position of a toasted bun portion and the toaster operates to dispense a subsequent toasted bun portion from the staging location with the queuing conveyor based upon the signal from the sensor.

13. The system of claim 1, wherein the bun dispenser and the toaster are part of an automated sandwich preparation system.

14. A method of bun holding and toasting, the method comprising:
receiving a selection of a bread product at the bun dispenser that comprises a bun holding cabinet in which a plurality of buns are held on shelves and each of the shelves comprise conveyors, each bun of the plurality comprising a heel, with a crumb-side opposite an exterior side, pre-sliced from a crown, with a crumb-side opposite an exterior side, and held in a complete condition;
operating a shuttle of the bun holding cabinet to translate within at least one axis to align the shuttle with a shelf to receive a bun based upon the selection received at the bun dispenser;
receiving the bun at a dispensing shelf from the shuttle;
separating the crown from the heel with a bun separator, the bun separator comprises at least one separator conveyor oriented vertically to the dispensing shelf by pulling the bun through a restriction formed between the separator conveyor and a wall to impart a lateral force to the sides of the bun;
receiving the bun into separate toasting paths of a toaster from the dispensing shelf;
thermally treating the crumb-side of the heel and the crumb-side of the crown, with the toaster;
receiving the crown and the heel on a queuing conveyor; and
sequentially dispensing the crown and the heel at a predetermined location with the queuing conveyor.

15. The method of claim 14 further comprising:
advancing the bun with the conveyor of the comprising the bun to position the bun on the shuttle; and
advancing the bun from the shuttle to the dispensing shelf with a conveyor associated with the shuttle.

16. Method of claim 15 wherein the dispensing shelf comprises a conveyor and further comprising:
receiving the bun from the shuttle onto the conveyor of the dispensing shelf; and
advancing the bun with the conveyor of the dispensing shelf to the bun separator.

17. The method of claim 16, further comprising:
queuing the toasted crown and heel on the queuing conveyor;
sensing a condition of a dispensing location with at least one sensor; and
based upon the sensed condition, operating the conveyor to dispense a the crown or the heel to the dispensing location.

18. The method of claim 17 further comprising:
receiving a toasting instruction for the bread product at the toaster; and
adjusting the toaster based upon the toasting instruction.

19. A system of bun holding and toasting comprising:
a bun dispenser comprising:
a bun holding cabinet having a plurality of shelves comprising conveyors in which a plurality of buns, each bun of the plurality comprising a heel, with a crumb-side opposite an exterior side, pre-sliced from a crown, with a crumb-side opposite an exterior side, and held in a complete condition, are held in the bun holding cabinet on the shelves; and
a shuttle that translates within at least one axis to align the shuttle with a shelf of the plurality of shelves to receive a bun from the shelf;
a dispensing shelf that receives the bun from the shuttle;
a bun separator on the dispensing shelf, the bun separator configured to apply a force to sides of the bun to separate the crown from the heel;
a toaster that receives the crown of the bun and the heel of the bun from the bun separator, the toaster comprising at least one conveyor belt and at least one heated platen configured to thermally treat a crumb-side of the heel and a crumb-side of the crown, the toaster further comprising a queuing conveyor configured to receive the crown and the heel from the at least one conveyor belt and moves the crown and the heel to a predetermined location;
wherein the bun separator further comprises a plurality of fingers, the plurality of fingers configured to rotate about a pivot point to laterally engage the sides of the bun wherein a first finger of the plurality of fingers is configured to engage the crown of the bun and a second finger of the plurality of fingers is configured to engage the heel of the bun and the lateral forces imparted by the plurality of fingers on the bun separates heel from the crown.

* * * * *